(12) United States Patent
Yamamoto et al.

(10) Patent No.: US 7,322,608 B2
(45) Date of Patent: Jan. 29, 2008

(54) STEERING COLUMN APPARATUS

(75) Inventors: Kou Yamamoto, Gunma-ken (JP); Daijiro Yamasaki, Gunma-ken (JP)

(73) Assignee: NSK Ltd., Tokyo (JP)

( * ) Notice: Subject to any disclaimer, the term of this patent is extended or adjusted under 35 U.S.C. 154(b) by 89 days.

(21) Appl. No.: 10/726,522

(22) Filed: Dec. 4, 2003

(65) Prior Publication Data
US 2004/0113408 A1   Jun. 17, 2004

(30) Foreign Application Priority Data
Dec. 12, 2002   (JP) .............................. 2002-361108

(51) Int. Cl.
*B62D 1/18* (2006.01)
(52) U.S. Cl. ........................................ 280/775; 74/493
(58) Field of Classification Search ................ 280/775; 74/492, 493
See application file for complete search history.

(56) References Cited

U.S. PATENT DOCUMENTS

| | | | |
|---|---|---|---|
| 3,977,692 A | 8/1976 | Findley et al. | |
| 4,535,645 A | 8/1985 | De Bisschop et al. | |
| 4,554,843 A | 11/1985 | Andersson | |
| 4,563,912 A | 1/1986 | Parks | |
| 4,890,505 A * | 1/1990 | Kinoshita et al. | 74/493 |
| 4,893,518 A * | 1/1990 | Matsumoto et al. | 74/493 |
| 5,152,627 A | 10/1992 | Arnold | |
| 5,199,319 A * | 4/1993 | Fujiu | 74/493 |
| RE34,359 E * | 8/1993 | Matsumoto et al. | 74/493 |
| 5,361,646 A * | 11/1994 | Venable | 74/531 |
| 5,363,716 A * | 11/1994 | Budzik et al. | 74/493 |
| 5,439,252 A * | 8/1995 | Oxley et al. | 280/775 |
| 5,598,741 A * | 2/1997 | Mitchell et al. | 74/493 |

(Continued)

FOREIGN PATENT DOCUMENTS

DE   4029573 A1   7/1991

(Continued)

OTHER PUBLICATIONS

U.S. Appl. No. 10/698,490, filed Nov. 3, 2003 (corresponds to Cite No. 7).

*Primary Examiner*—Paul N. Dickson
*Assistant Examiner*—Drew J. Brown
(74) *Attorney, Agent, or Firm*—Miles & Stockbridge P.C.

(57) ABSTRACT

A steering column apparatus comprises a steering shaft having its rear end to which a steering wheel is secured, a steering column supporting rotatably the steering shaft and adjustable of its length in axial directions together the steering shaft, and telescopic position fixing means for fixing the steering column to a desired length. The steering column is constructed of an outer column fixed on a car body side and an inner column slidably fitted in the outer column. The telescopic position fixing means is constructed of a lock housing formed on the outer column, first and second press blocks slidably held by the lock housing and moving forwards and backwards in a way that embraces an outer peripheral surface of the inner column, and presses block driving means for bringing the first and second press-blocks into a press-contact with the inner column. The press block driving means includes a fixed cam provided on the second press block, a rotatable cam facing the fixed cam, a fastening lever used for rotating the rotatable cam. An interval between the rotatable cam first press block is adjustable.

4 Claims, 10 Drawing Sheets

U.S. PATENT DOCUMENTS

| | | | |
|---|---|---|---|
| 5,743,150 A * | 4/1998 | Fevre et al. | 74/493 |
| 5,941,129 A * | 8/1999 | Anspaugh et al. | 74/493 |
| 5,979,265 A * | 11/1999 | Kim et al. | 74/493 |
| 6,036,228 A * | 3/2000 | Olgren et al. | 280/775 |
| 6,062,101 A * | 5/2000 | Higashino | 74/493 |
| 6,092,957 A * | 7/2000 | Fevre et al. | 403/373 |
| 6,467,807 B2 * | 10/2002 | Ikeda et al. | 280/775 |
| 6,623,036 B2 * | 9/2003 | Yamamura et al. | 280/775 |
| 6,659,504 B2 | 12/2003 | Riefe et al. | |
| 6,695,349 B2 * | 2/2004 | Bohlen et al. | 280/775 |
| 6,799,779 B2 * | 10/2004 | Shibayama | 280/777 |
| 6,948,741 B2 * | 9/2005 | Manwaring et al. | 280/775 |
| 2004/0090058 A1 | 5/2004 | Yamamoto | |

FOREIGN PATENT DOCUMENTS

| | | |
|---|---|---|
| JP | 5-178218 | 7/1993 |
| JP | 5-262238 | 10/1993 |
| JP | UM 6-295 | 1/1994 |
| JP | UM 2588338 | 10/1998 |
| JP | 2002-67976 | 3/2002 |
| JP | 2002-67977 | 3/2002 |
| JP | 2002-166835 A | 6/2002 |
| JP | 2004-155268 A | 6/2004 |

* cited by examiner

STEERING COLUMN APPARATUS

This application claims the benefit of Japanese Patent Application No. 2002-361108 which is hereby incorporated by reference.

BACKGROUND OF THE INVENTION

1. Field of the Invention

The present invention relates generally to a steering column apparatus constituting a steering apparatus for an automobile, etc., and more particularly to a technology of smoothly fastening and releasing an inner column when adjusting a telescopic or axial position of a steering wheel.

2. Related Background Art

A steering apparatus of an automobile is used by a multiplicity of unspecified drivers, and it is therefore desired that a position of a steering wheel be adjustable corresponding to an individual physique, a driving posture, etc. For meeting such demands, there are an increase in a number of freight cars, etc., adopting a tilt adjusting mechanism and/or a telescopic position adjusting mechanism, without being limited to the passenger cars.

The tilt adjusting mechanism is a mechanism for adjusting the position of the steering wheel in up-and-down directions. The tilt adjusting mechanism is constructed of a tilt pivot for supporting a steering column in a rotatable manner, a tilt fixing member for fixing the steering column in a desired position (at a desired tilt angle), and so on. Further, the telescopic position adjusting mechanism is a mechanism for adjusting the position of the steering wheel in front-and-rear directions (in axial directions of a steering shaft). The telescopic position adjusting mechanism is constructed of a double tube type extensible/retractable unit including an outer column and an inner column that are used for extending and retracting the steering column, and of a telescopic position fixing member for fixing the inner column in a desired position (in a desired extended/retracted state).

A general type of conventional telescopic position fixing member is that the outer column is formed with slits, and the inner column is fixed by reducing a diameter of the outer column by a screw mechanism. There appears, however, a telescopic position fixing member, wherein the inner column is seized by pressure and thus fixed by press blocks held by the outer column. The latter telescopic position fixing member is constructed of, for example, as shown in FIG. 10, a lock housing 15 formed at a rear side end of an outer column 3, a pair of left and right press blocks (first and second press blocks 21, 23) slidably held downwardly of the lock housing 15, a fastening bolt 71 screwed into the first press block 21, a nut 75 screwed on the fastening bolt 71, and a fastening lever 35 fixed to the nut 75. Then, the two press blocks 21, 23 become proximal to or separated away from each other by rotating the fastening lever 35, whereby the inner column 5 is fixed or released (refer to, e.g., Japanese Utility Model Registration No.2588338).

The telescopic position fixing member disclosed in Japanese Utility Model Registration No.2588338 has a problem that will hereinafter be explained. For instance, this telescopic position fixing member has a drawback, wherein the first and second press blocks 21, 23 are driven by the screw mechanism, and hence, if an operating force of the driver is too large for fastening by the fastening lever 35, the two press blocks 21, 23 are intruded onto the inner column 5, resulting in a plastic deformation of the inner column 5. Further, the two press blocks 21, 23 move in the horizontal direction along an axis of the fastening bolt 71, and therefore, in case an operation quantity of the fastening lever when performing a releasing operation is small, it follows that moving quantities of the two press blocks 21, 23 with respect to the inner column 5 become also small. In this case, the inner column 5 is not perfectly released and is brought into the press-contact with the two press blocks 21, 23, with the result that the operation of adjusting the telescopic position might not be smoothly conducted, and that scratching or biting might occur when performing the telescopic position adjusting operation.

SUMMARY OF THE INVENTION

The present invention was devised under such circumstances and aims at providing a steering column apparatus capable of smoothly fastening and releasing an inner column when adjusting a telescopic or axial position of a steering wheel.

To accomplish the above object, according to one aspect of the present invention, a steering column apparatus includes a steering shaft having its rear end to which a steering wheel is secured, a steering column supporting rotatably the steering shaft and adjustable of its length in axial directions together with the steering shaft, and a telescopic position fixing member for fixing the steering column to a desired length, wherein the steering column is constructed of an outer column fixed on a car body side and an inner column slidably internally fitted to the outer column, the telescopic position fixing member is constructed of a lock housing formed on the outer column, first and second press blocks slidably held by the lock housing and moving forwards and backwards in a way that embraces an outer peripheral surface of the inner column, and a press block driving member for bringing the first and second press blocks into a press-contact with the inner column, and the press block driving member includes a fixed cam provided on the second press block, a rotatable cam facing the fixed cam, a fastening lever used for rotating the rotatable cam, and an interval regulating member for regulating an interval between the rotatable cam and the first press block.

According to the steering column apparatus of the present invention, it is possible to set comparatively unrestrictedly moving quantities of the two press blocks with respect to an operation quantity of the fastening lever by properly setting a cam profile between the fixed cam and the rotatable cam. In addition, excessive fastening by the fastening lever can be prevented by forming a stopper between the fixed cam and the rotatable cam.

Further, in the steering column apparatus according to the present invention, preferably the press block driving member includes a biasing member for biasing the first press block and the second press block in such a direction as to be separated away from each other. According to this construction, it is feasible to separate the two press blocks from each other more surely when releasing the inner column.

Moreover, in the steering column apparatus according to the present invention, preferably the fixed cam can be made integral with the second press block. In this case, the number of the components can be reduced, and besides a backlash becomes hard to occur when releasing the inner column.

Furthermore, in the steering column apparatus according to the present invention, preferably the press block driving member further includes an inclined guide member, formed in the lock housing, for assisting at least one of the first and second press blocks to descend or ascend in such a direction as to be separated away from the inner column on such an occasion that the first and second press blocks are separated away from each other. According to this construction, the press block is separated away from the inner column in the vertical direction as well as in the horizontal direction when releasing the inner column, whereby the release of the inner column is more surely performed.

Still further, according to another aspect of the present invention, a steering column apparatus includes a steering shaft having its rear end to which a steering wheel is secured, a steering column supporting rotatably the steering shaft and adjustable of its length in axial directions together with the steering shaft, and a telescopic position adjusting member for fixing the steering column to a desired length, wherein the steering column is constructed of an outer column fixed on a car body side and an inner column slidably internally fitted to the outer column, the telescopic position adjusting member is constructed of a lock housing formed on the outer column, first and second press blocks slidably held by the lock housing and moving forwards and backwards in a way that embraces an outer peripheral surface of the inner column, and press block driving member for bringing the first and second press blocks into a press-contact with the inner column, and the press block driving member includes a fastening bolt having its one side end fixed to the first press block and penetrating the second press block, a nut screwed onto a threaded portion provided at the other end of the fastening bolt and having its side surface abutting on the second press block, a fastening lever used for rotating the nut, and an inclined guide member, formed in the lock housing, for assisting at least one of the first and second press blocks to descend or ascend in such a direction as to be separated away from the inner column on such an occasion that the first and second press blocks are separated away from each other. According to this construction, the press block is separated away from the inner column in the vertical direction as well as in the horizontal direction when releasing the inner column, whereby the release of the inner column is more surely conducted.

Other features and advantages of the present invention will become readily apparent from the following description taken in conjunction with the accompanying drawings.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principle of the invention, in which.

DESCRIPTION OF THE PREFERRED EMBODIMENTS

Embodiments of a steering column apparatus according to the present invention will hereinafter be described with reference to FIGS. 1 through 9. Note that a right side in FIG. 1 is assumed to be a rear side, and the right side in FIG. 2 is assumed to be right as it is in the following discussion on the embodiment.

Figure 1:
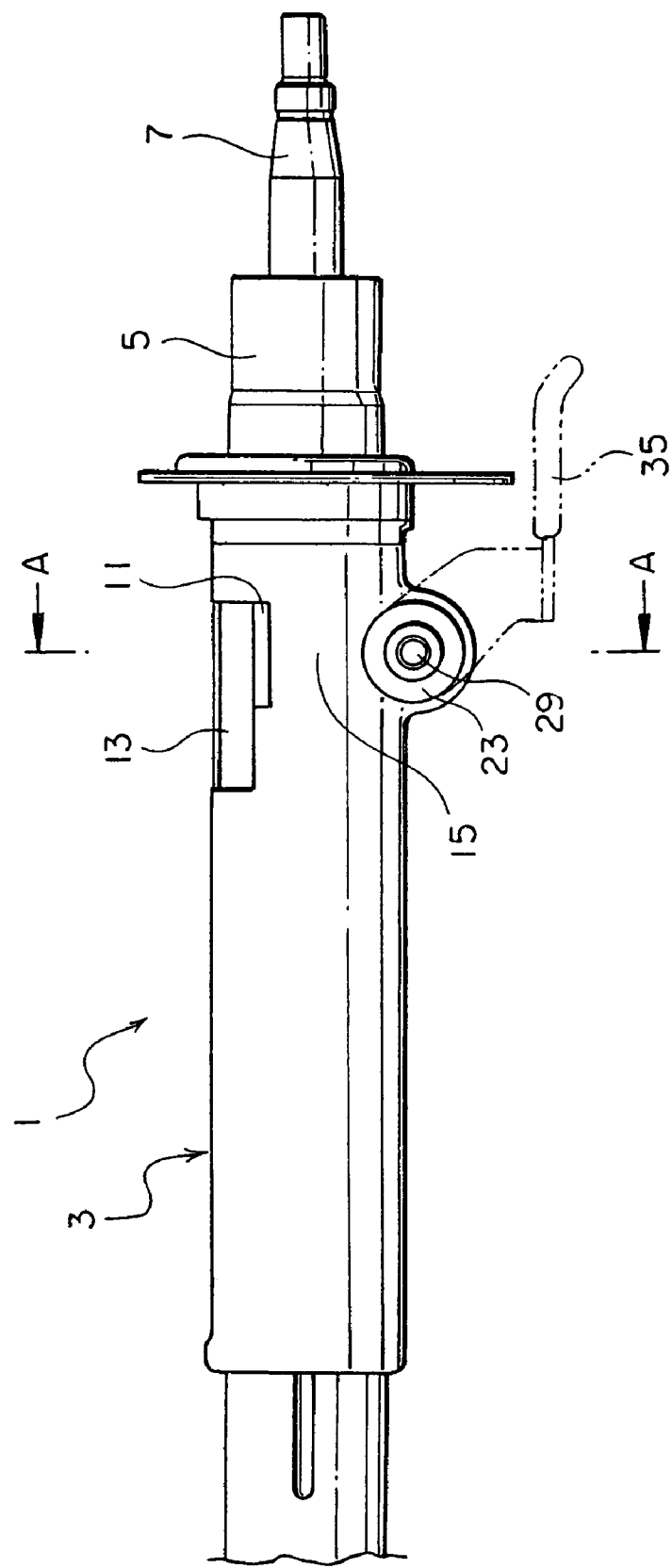
FIG. 1 is a side view of a steering column apparatus in a first embodiment of the present invention.

FIG. 1 is a side view of the steering column apparatus in a first embodiment of the present invention. FIG. 2 is an enlarged sectional view taken along the line A-A in FIG. 1. A steering column 1 is constructed of an outer column 3 as a cast molding of which a material is an aluminum alloy, etc., and an inner column 5 composed of a steel tube that is slidably fitted in the outer column 3. A steering shaft 7 with its rear end to which an unillustrated steering wheel is secured, is rotatably supported within the inner column 5 through an unillustrated bearing.

Figure 2:
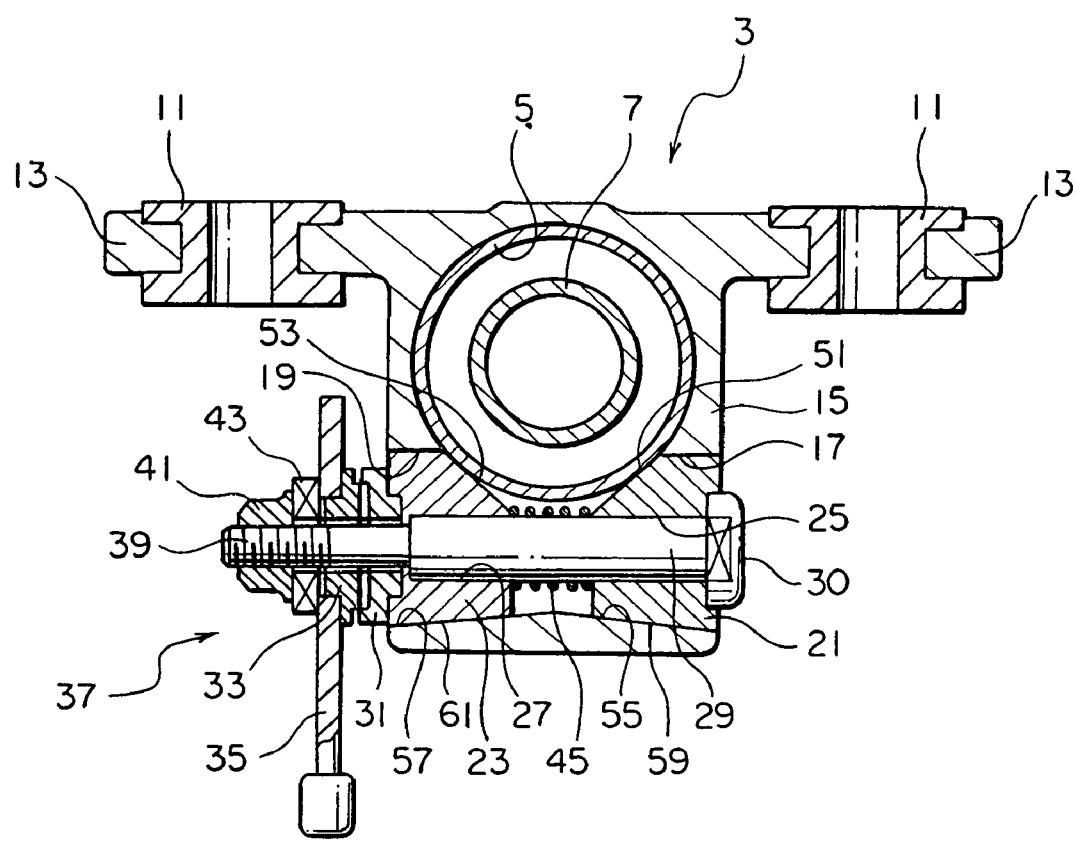
FIG. 2 is an enlarged sectional view taken along the line A-A in FIG. 1.

As illustrated in FIG. 2, a rear portion of the outer column 3 is integrally formed with a support bracket 13 on which release capsules 11 are fitted from the rear side, and with a lock housing 15 embracing an outer peripheral portion of the inner column 5 over a range of a given length exclusively of a part of the lower portion thereof. The lock housing 15 protrudes by far more downwards than the inner column embracing portion, and this downward protrusion is formed with press block holding holes 17, 19 in the right and left portions thereof. A first press block 21 and a second press block 23 are inserted respectively into these press block holding holes 17 and 19.

These two press blocks 21, 23 have through-holes 25, 27 extending respectively in the right-and-left directions. A bolt 29 is inserted through these through-holes 25, 27 from rightward (from the side of the first press block 21). A head 30 of the bolt 29 that abuts on an outer side surface of the first press block 21, constitutes one interval regulating member. A cam mechanism 37 constructed of a fixed cam 31 engaging with the second press block 23, a movable cam 33 facing the fixed cam 31 and a fastening lever 35 engaging the movable cam 33, is provided on the side of an outer side end surface of the second press block 23.

The bolt 29 has a screw portion 39 at its front end. After the bolt 29 has penetrated the cam mechanism 37, a nut 41 constituting the other interval regulating member is screwed on the threaded portion 39 and fastened. A thrust bearing 43 is interposed between the fastening lever 35 and the nut 41. A compression coil spring 45 defined as a biasing member is interposed between the first press block 21 and the second press block 23. The bolt 29 penetrates inside the compression coil spring 45.

The two pieces of press blocks 21, 23 have inclined press surfaces 51, 53 formed on inner upper portions thereof. In the fixed state illustrated in FIG. 2, these inclined press surfaces 51, 53 abut on an outer peripheral surface of the inner column 5. Further, bottom surfaces of the press block holding holes 17, 19 serve as inclined guide surfaces 55, 57 inclined downwardly towards the outsides. Lower surfaces of the two press blocks 21, 23 are formed as inclined surfaces 59, 61 corresponding to these inclined guide surfaces 55, 57.

The following is a description of an operation of the first embodiment.

In the steering column apparatus in the first embodiment, if a position of the steering wheel becomes inadequate due to replacement of a driver, the driver at first rotates the fastening lever 35 by a predetermined quantity in a predetermined rotating direction (which will hereinafter be referred to as a releasing direction). Thereupon, the fixed cam 31 and the movable cam 33 of the cam mechanism 37 make relative rotations, and a raised portion of one cam enter a depression of the other cam, whereby the two cams 31, 33 become proximal to each other.

Figure 3:
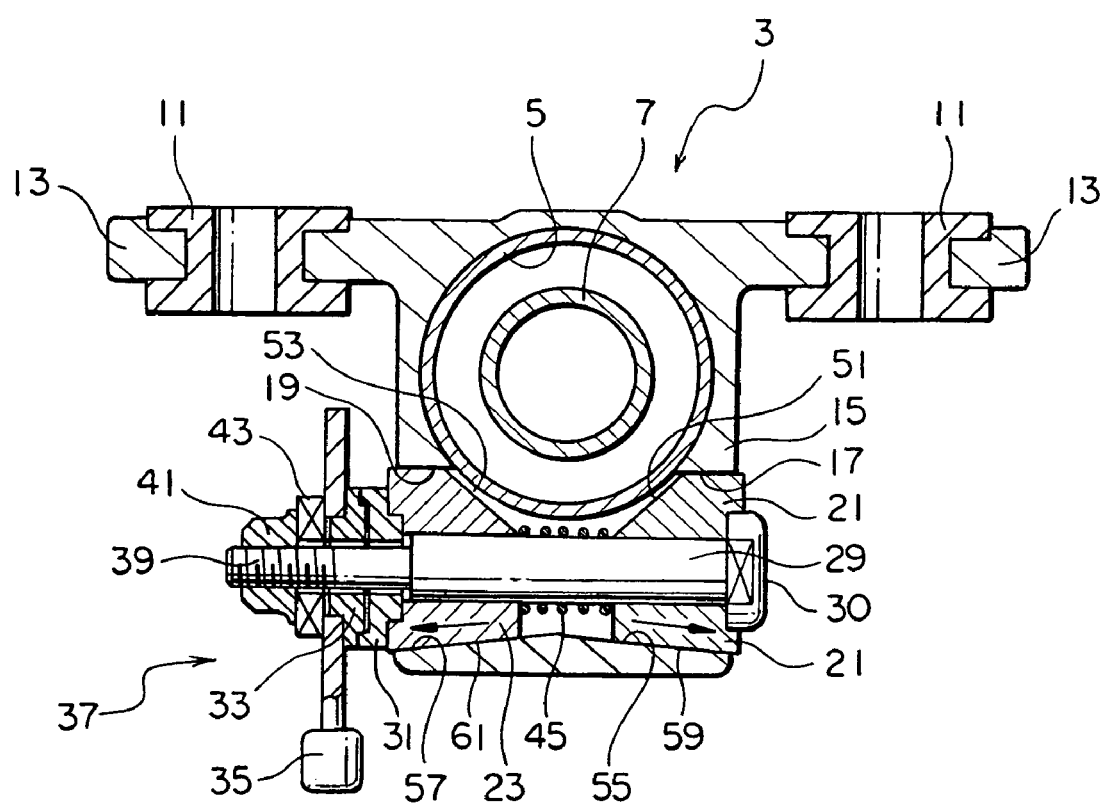
FIG. 3 is an explanatory view showing an operation in the first embodiment.

With this operation, as shown in FIG. 3, an interval between the head 30 of the bolt 29 and the fixed cam 31 expands, with the result that the first press block 21 and the second press block 23 are, as they are biased by the compression coil spring 45, separated from each other and both of them are moved outwards. On this occasion, respective inclined surfaces 59, 61 of the two press blocks 21, 23 are kept slid on the inclined guide surfaces 55, 57 of the press block holding holes 17, 19, and therefore the two press blocks 21, 23 descend by action of the gravity.

As a result, the inclined press surfaces 51, 53 of the two press blocks 21, 23 are well separated from the outer peripheral surface of the inner column 5, thereby enabling a telescopic position of the inner column 5 to be smoothly adjusted.

The driver, after adjusting the steering wheel to a desired position by telescopically moving the inner column 5, rotates the fastening lever 35 by a predetermined quantity this time in a rotating direction (which will hereinafter be called a fixing direction) opposite to the direction of the last time. Thereupon, the fixed cam 31 and the movable raised cam 33 of the cam mechanism 37 are, with their raised portions abutting with each other, separated from each other, whereby the inner column 5 gets fixed in the procedures opposite to the above-mentioned.

On this occasion, the fixed cam 31 and the movable cam 33 are not separated farther than the predetermined quantity irrespective of a quantity of the relative rotations. Hence, there does not occur excessive fastening (by the two press blocks 21, 23 against the inner column 5) which has hitherto been a problem inherent in the conventional apparatuses. Note that a click feeling can be given to the fastening lever 35 or a rotational angle of the fastening lever 35 can be regulated within a predetermined range by properly setting a cam profile between the fixed cam 31 and the movable cam 33.

Figure 4:
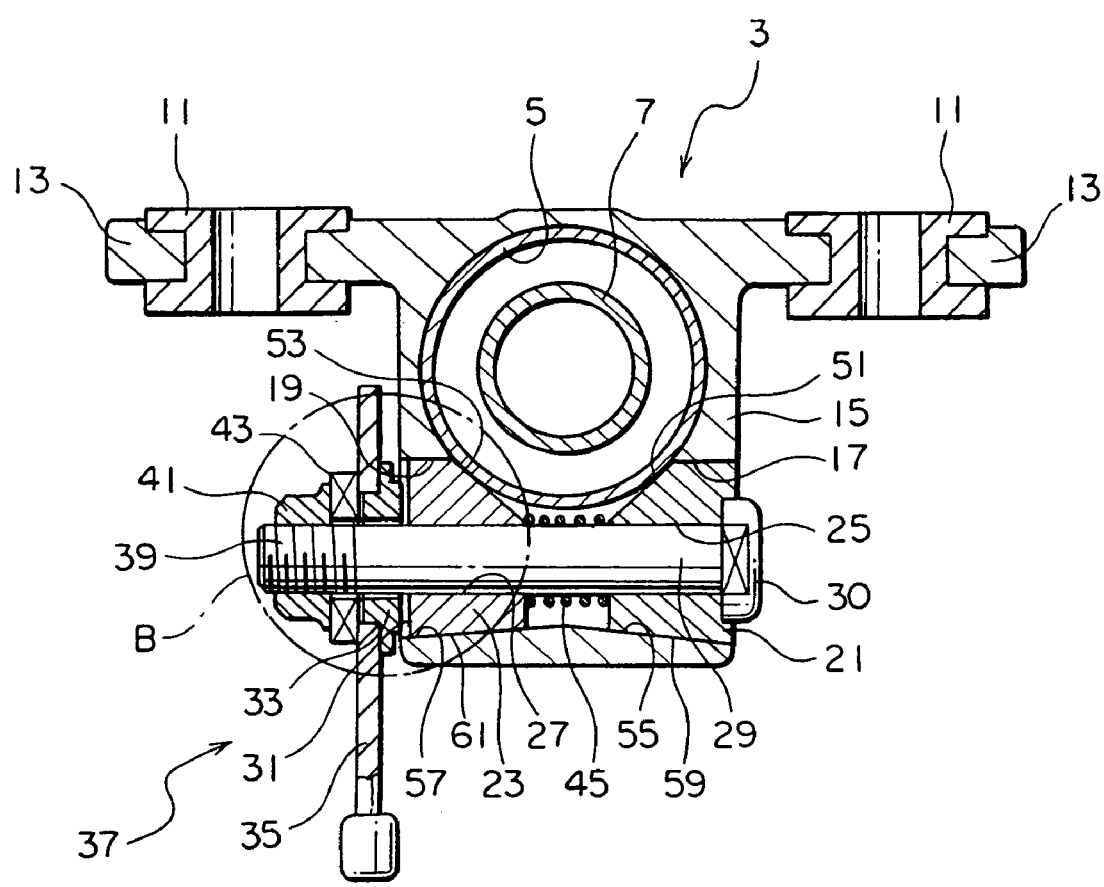
FIG. 4 is a vertical sectional view showing a principal portion of the steering column apparatus in a second embodiment of the present invention.
Figure 5:
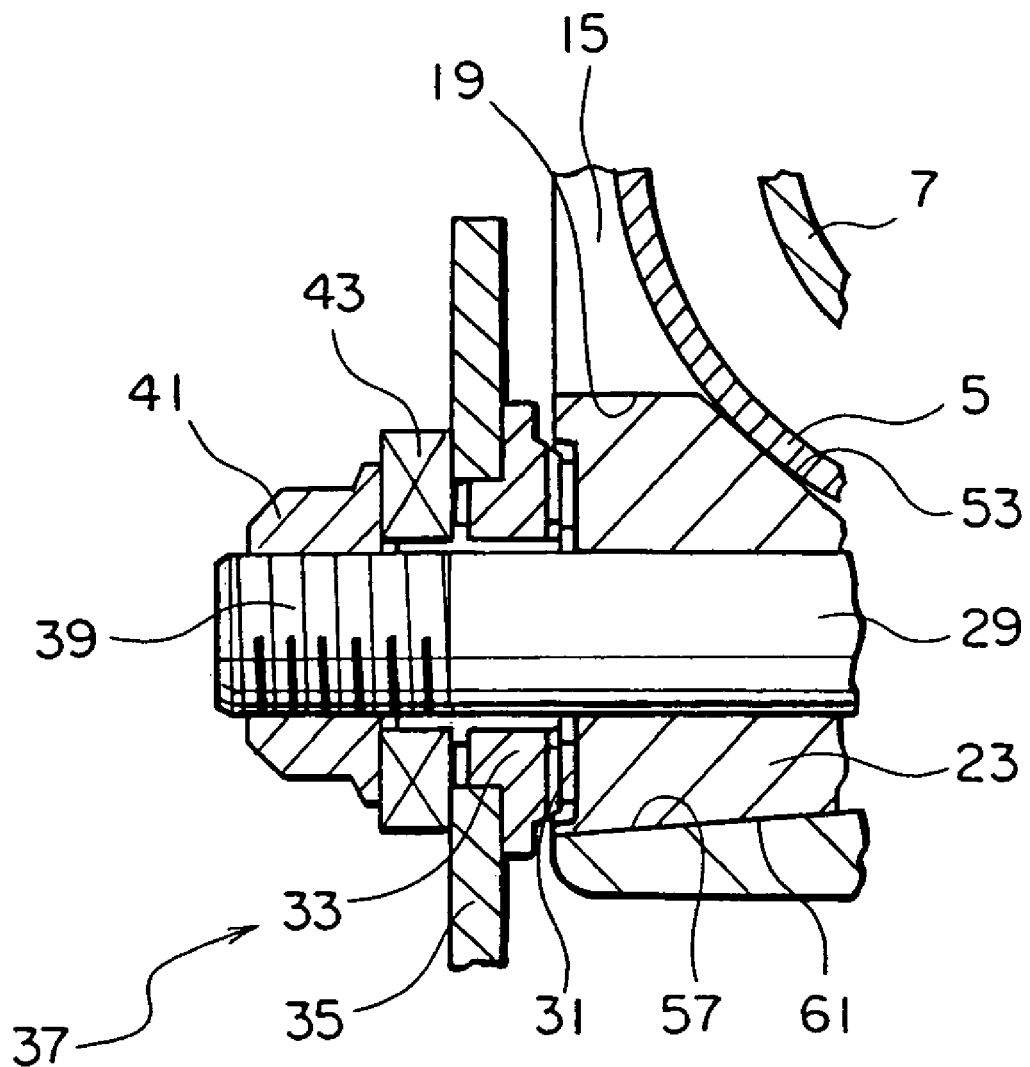
FIG. 5 is an enlarged view of a portion B in FIG. 4.

FIG. 4 is a vertical sectional view showing a principal portion of the steering column apparatus in a second embodiment of the present invention. FIG. 5 is an enlarged view of a portion B in FIG. 4. As shown in FIGS. 4 and 5, the whole construction in the second embodiment is substantially the same as the first embodiment has, however, the fixed cam 31 is formed by sinter molding integrally with the second press block 23. With this contrivance, the second embodiment has merits, wherein there are reduced both the number of the components and a backlash caused when operating the fastening lever 35. The integrally-structured body of the fixed cam 31 and the second press block 23 is not limited to the sinter molding and may also be formed by cutting and other machining.

Figure 6:
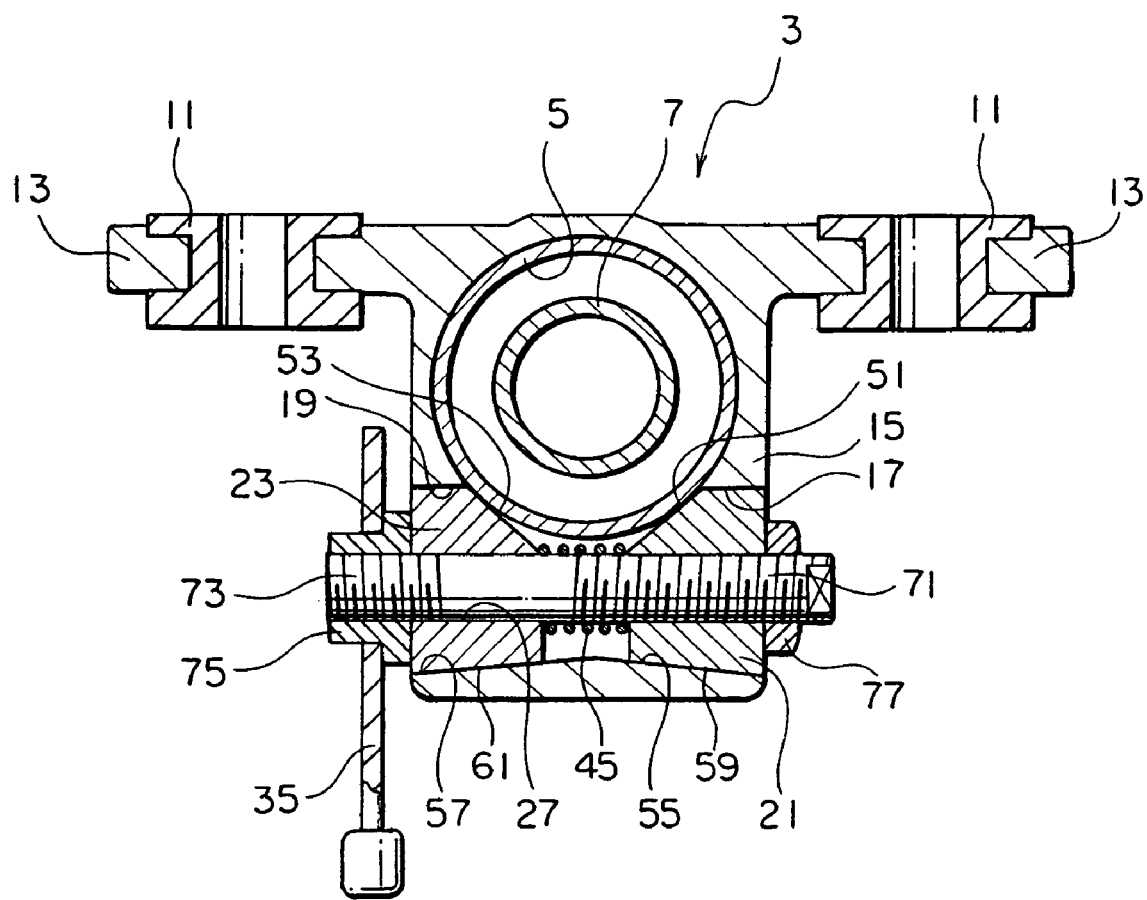
FIG. 6 is a vertical sectional view showing a principal portion of the steering column apparatus in a third embodiment of the present invention.

FIG. 6 is a vertical sectional view of a principal portion of the steering column apparatus in a third embodiment of the present invention. The third embodiment involves, unlike the first and second embodiments, using a screw mechanism as press block driving means. Namely, according to the third embodiment, the apparatus includes a fastening bolt 71 screwed in and fixed to the first press block 21, a lock nut 77 for screwed on and fixed to the fastening bolt 71, a nut 75 screwed onto a thread portion 73 formed at the front end of the fastening bolt 71, and a fastening lever 35 fixed to the nut 75, wherein the two press blocks 21, 23 become proximal to or separated from each other by rotating the fastening lever 35, and the inner column 5 is fixed or released.

In the third embodiment also, as in the first and second embodiments, the bottom surfaces of the press block holding holes 17, 19 serve as the inclined guide surfaces 55, 57 inclined downwardly towards the outsides. The lower surfaces of the two press blocks 21, 23 are formed as inclined surfaces 59, 61 corresponding to these inclined guide surfaces 55, 57. Therefore, the driver operates the fastening lever 35 in the releasing direction, and, when the first press block 21 and the second press block 23 are separated from each other by the action of the compression coil spring 45 and both of them are moved outwards, the two press blocks 21, 23 descend by action of the gravity as in the first embodiment.

With this operation, the inclined press surfaces 51, 53 of the two press blocks 21, 23 are well separated from the outer peripheral surface of the inner column 5, thereby enabling the telescopic position thereof to be smoothly adjusted.

Figure 7:
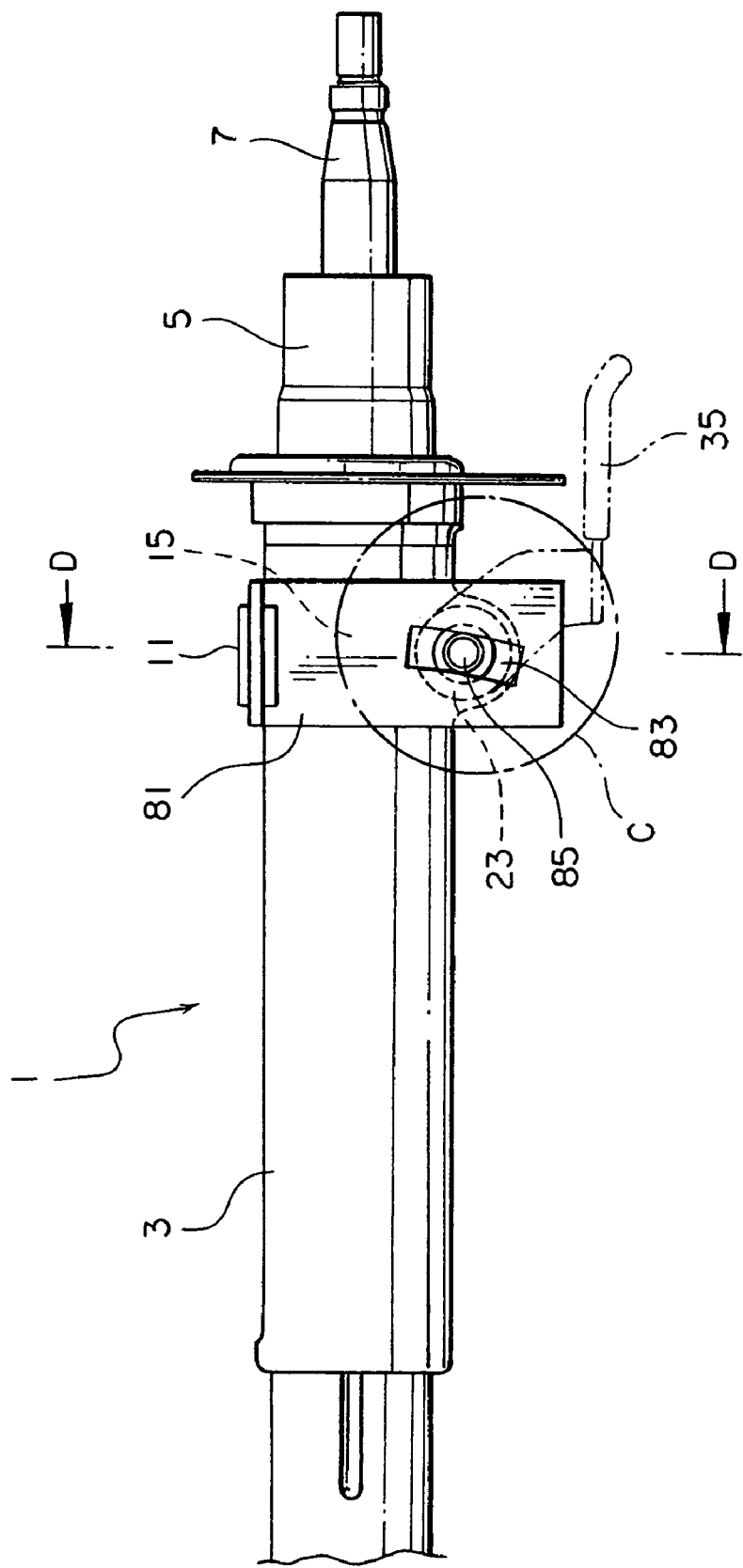
FIG. 7 is a side view of the steering column apparatus in a fourth embodiment of the present invention.
Figure 8:
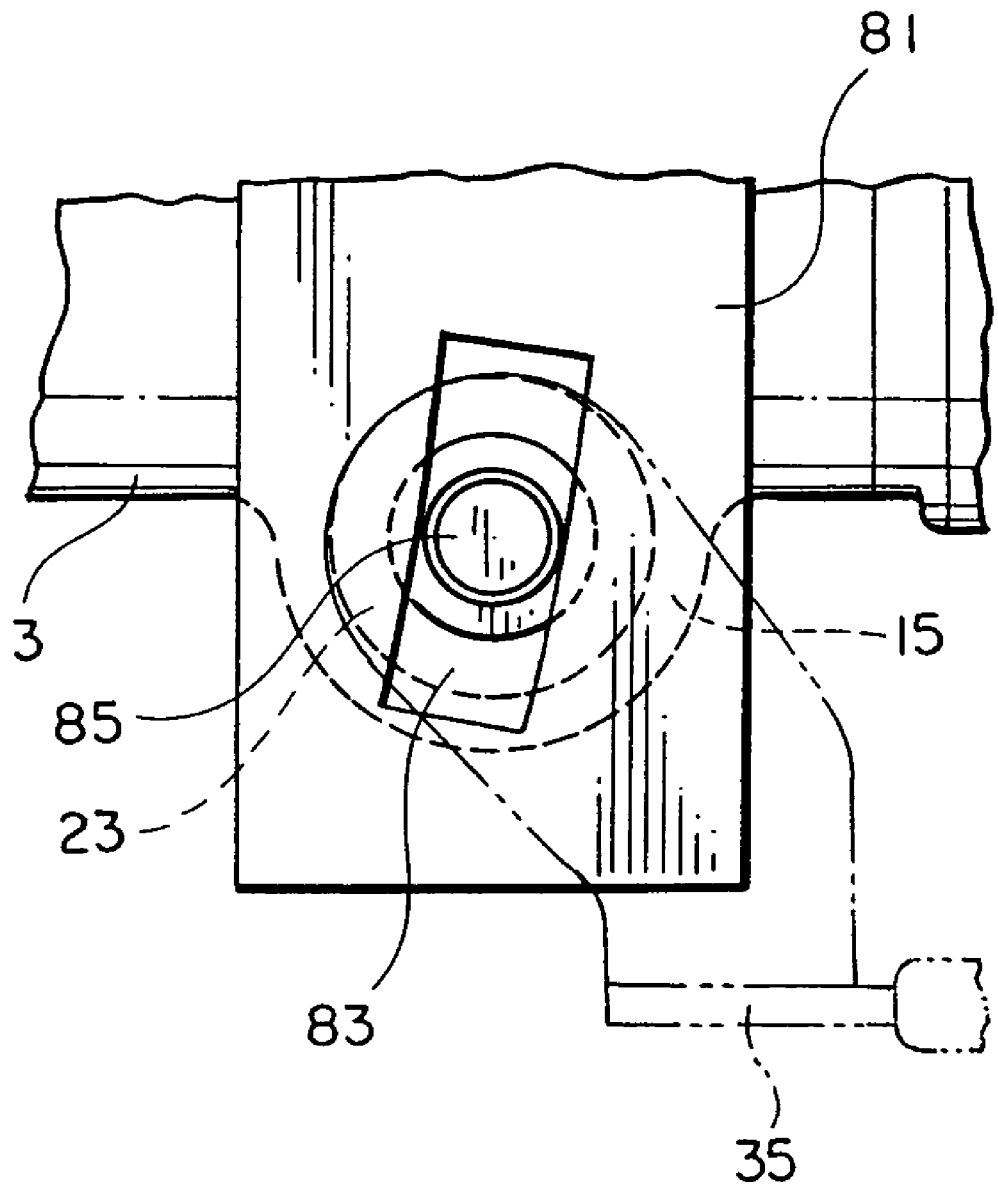
FIG. 8 is an enlarged view of a portion C in FIG. 7.
Figure 9:
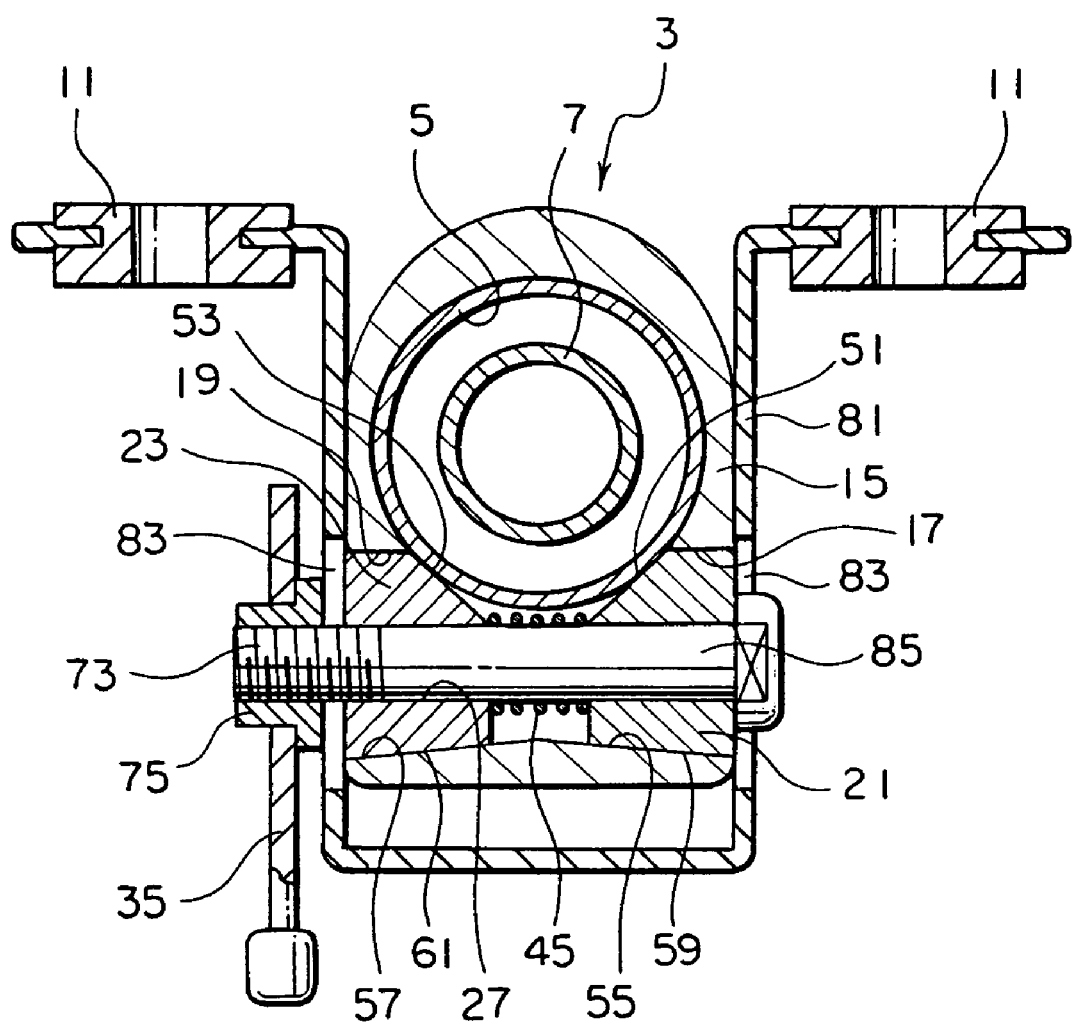
FIG. 9 is an enlarged sectional view taken along the line D-D in FIG. 8.
Figure 10:
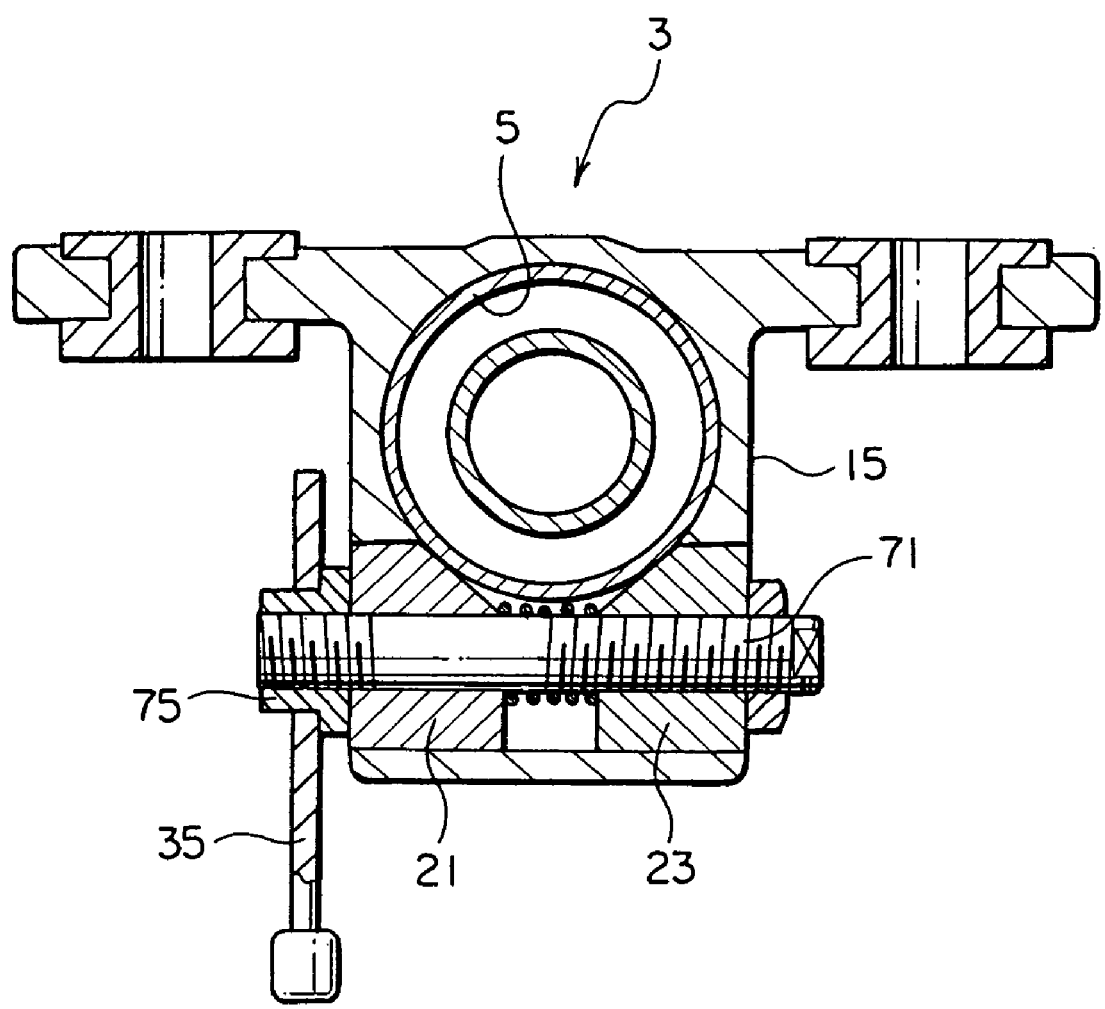
FIG. 10 is a vertical sectional view showing a principal portion in a conventional apparatus.

FIG. 7 is a side view of the steering column apparatus according to a fourth embodiment of the present invention. FIG. 8 is an enlarged view of a portion C in FIG. 7. FIG. 9 is an enlarged sectional view taken along the line D-D in FIG. 8. In the fourth embodiment, the present invention is applied to the steering column apparatus provided with a tilt adjusting mechanism. A construction according to the invention in the fourth embodiment is substantially the same as that of the third embodiment discussed above, and the lock housing 15 which is integral with the outer column and embraces the inner column 5, with some portion excluded, is held by a tilt bracket 81 press-molded from a steel plate. A tilt adjusting bolt 85 which is movable within a tilt adjustment hole 83 formed in the tilt bracket 81, serves as a fastening bolt.

In the fourth embodiment, when the driver rotates the fastening lever 35 in the releasing direction, the tilt bracket 81 expands by a predetermined quantity owing to its elasticity, thereby enabling the steering column 1 to move in up-and-down directions. Further, with a release from a holding pressure by the tilt bracket 81, the first press block 21 and the second press block 23 are separated from each other, and both of them are moved outwards. Then, the two press blocks 21, 23 descend by action of the gravity as in the first embodiment.

With this operation, the driver becomes able to make a tilt adjustment by grasping the steering wheel and make a smooth adjustment of the telescopic position of the steering wheel at the same time.

The discussion on the specific embodiments so far comes to an end, however, the mode of the present invention is not limited to the embodiments described above. For example, the right and left press blocks are provided respectively with the inclined guide surfaces in each of the embodiments, however, only any one of the press blocks may be provided with the inclined guide surface. Further, the press block may be a cutting work product, a casting product and a cast molding of which materials are steel aluminum alloys, etc., and may also be a molding composed of a sintered alloy, etc. As for others, the specific configuration of the press block, the construction of the press block driving member and so forth can be properly changed within the range that does not deviate from the gist of the present invention. A cross sectional shape of the first or second block may be circular, non-circular or polygonal. The clamp mechanism which includes press blocks and others may be disposed above the inner column.

As discussed above, the steering column apparatus according to the present invention includes the steering shaft with its rear side end to which the steering wheel is secured, the steering column supporting this steering shaft rotatably and becoming extensible and retractable in the axial directions together with the steering shaft, and the telescopic position fixing member for fixing the steering column in an extended/retracted state. The steering column is constructed of the outer column fixed on the car body side and the inner column slidably internally fitted to the outer column. The telescopic position fixing member is constructed of the lock housing formed on the outer column, the first and second press blocks slidably held by the lock housing and moving forwards and backwards in a way that embraces the outer peripheral surface of the inner column, and the press block driving member for bringing the first and second press blocks into a press-contact with the inner column. The press block driving member includes the fixed cam provided on the second press block, the rotatable cam facing the fixed cam, the fastening lever used for rotating the rotatable cam, and the interval regulating member for regulating the interval between the rotatable cam and the first press block. It is therefore possible to set comparatively unrestrictedly the moving quantities of the two press blocks with respect to the operation quantity of the fastening lever by properly setting the cam profile between the fixed cam and the rotatable cam. In addition, the excessive fastening by the fastening lever can be prevented by forming a stopper between the fixed cam and the rotatable cam.

Moreover, in the apparatus where the press block driving member includes the inclined guide member, formed in the lock housing, for assisting at least one of the first and second press blocks to descend or ascend in such a direction as to be separated away from the inner column on such an occasion that the first and second press blocks are separated away from each other, the press block is separated away from the inner column in the vertical direction as well as in the horizontal direction when releasing the inner column, whereby the release of the inner column is more surely performed.

The present invention has been discussed by way of the embodiments but may be modified in many forms within the range of the gist of the present invention, and these modifications are not excluded from the scope of the present invention.

What is claimed is:

1. A steering column apparatus comprising:
a steering shaft having a rear end to which a steering wheel is secured;
a steering column rotatably supporting said steering shaft and being of adjustable length in axial directions thereof together with said steering shaft; and
a telescopic position fixing mechanism operable to fix said steering column to a desired length,
wherein said steering column includes an outer column fixed on a vehicle body side and an inner column telescopically fitted in said outer column,
said telescopic position fixing mechanism includes a lock housing disposed on said outer column, first and second press blocks, each slidably held within a bore of said lock housing, a bolt passing through said first and second press blocks, said first and second press blocks having said bolt non-threadably received therein so as to be slidable on said bolt and being movable toward and away from each other to press and release said inner column so as to fix and release the telescopic position of said steering column, and a press block driving mechanism operable to move said first and second press blocks toward and away from each other,
said press block driving mechanism including a first cam formed on said second press block such that said first cam and said second press block constitute a single integral body, a rotatable cam facing said first cam, a fastening lever used for rotating said rotatable cam, interval regulating members which regulate an interval between said rotatable cam and said first press block, and a biasing device which biases said first press block and said second press block away from each other.

2. A steering column apparatus according to claim 1, wherein said press block driving mechanism further includes an inclined guide member, formed in said lock housing, to facilitate movement of at least one of said first and second press blocks away from the other.

3. A steering column apparatus comprising:
a steering shaft having a rear end to which a steering wheel is secured;
a steering column rotatably supporting said steering shaft and being of adjustable length in axial directions thereof together with said steering shaft, said steering column including an outer column fixed on a vehicle body side and an inner column telescopically fitted in said outer column; and
a telescopic position fixing mechanism operable to fix said steering column to a desired length, said telescopic position fixing mechanism including a lock housing disposed on said outer column, first and second press blocks, each slidably fitted within a bore formed through said lock housing in a vehicle body widthwise direction, a bolt passing through said first and second press blocks, said first and second press blocks having said bolt non-threadably received therein so as to be slidable on said bolt and being movable toward and away from each other to press and release said inner column so as to fix and release the telescopic position of said steering column, and a press block driving mechanism operable to control movement of said first and second press blocks,
wherein said press block driving mechanism includes an interval regulating mechanism having a first regulating member and a second regulating member provided at respective end portions of said bolt so as to regulate movements, along an axis of the bolt, of said first and second press blocks to a predetermined interval, said first regulating member being in direct contact with said first press block to regulate movement thereof along the bolt axis, a distance adjusting mechanism provided between said second regulating member and said second press block for changing a distance therebetween, said distance adjusting mechanism including a rotatable cam and a fixed cam which is formed on said second press block such that said fixed cam and said second press block constitute a single integral body, an operating lever for operating the rotatable cam of the distance adjusting mechanism to change said distance between said second regulating member and said second press block, and a biasing device which biases said first press block and said second press block away from each other,
wherein when said distance adjusting mechanism is operated to make the distance between said second regulating member and said second press block larger, the first and second press blocks are moved toward each other so as to press the outer surface of said inner column, and when said distance adjusting mechanism is operated to make the distance between said second regulating member and said second press block smaller, said first and second press blocks are moved away from each other so as to release the pressure on said inner column.

4. A steering column apparatus comprising;

a steering shaft having a rear end to which a steering wheel is secured;

a steering column rotatably supporting said steering shaft and being of adjustable length in axial directions thereof together with said steering shaft, said steering column including an outer column fixed on a vehicle body side and an inner column telescopically fitted in said outer column; and a telescopic position fixing mechanism operable to fix said steering column to a desired length, said telescopic position fixing mechanism including a lock housing disposed on said outer column, first and second press blocks, each slidably fitted within a bore formed through said lock housing in a vehicle body widthwise direction, a bolt passing through said first and second press blocks, said first and second press blocks having said bolt non-threadably received therein so as to be slidable on said bolt and being movable toward and away from each other to press and release said inner column so as to fix and release the telescopic position of said steering column, and a press block driving mechanism operable to control movement of said first and second press blocks, wherein said press block driving mechanism includes an interval regulating mechanism having a first regulating member and a second regulating member provided at respective end portions of said bolt so as to regulate movements, along an axis of the bolt, of said first and second press blocks to a predetermined interval, said first regulating member being in direct contact with said first press block to regulate movement thereof along the bolt axis, a first cam fitted slidably on the bolt and formed on said second press block such that said first cam and said second press block constitute a single integral body, a rotatable cam disposed between the first cam and the second regulating member to face said first cam, a fastening lever used for rotating said rotatable cam, and a biasing device which biases said first press block and said second press block away from each other, wherein when said cams are moved away from each other, said first and second press blocks are moved toward each other so as to press said inner column, and when said cams are moved toward each other, said first and second press blocks are moved away from each other so as to release the pressure on said inner column.

* * * * *